United States Patent [19]

Vinson et al.

[11] Patent Number: 5,374,324
[45] Date of Patent: Dec. 20, 1994

[54] APEXED BEAD FOR A TIRE

[75] Inventors: Jerry W. Vinson; Benjamin C. Blasingame, both of Opelika, Ala.

[73] Assignee: Uniroyal Goodrich Licensing Services, Inc., Wilmington, Del.

[21] Appl. No.: 86,490

[22] Filed: Jul. 1, 1993

Related U.S. Application Data

[63] Continuation of Ser. No. 846,749, Mar. 9, 1992, abandoned, which is a continuation of Ser. No. 574,336, Aug. 28, 1990, abandoned.

[51] Int. Cl.$^5$ .............................................. B29D 30/48
[52] U.S. Cl. .................... 156/130.7; 156/136
[58] Field of Search ........... 156/130.7, 131, 132, 156/135, 136, 400–403

[56] References Cited

U.S. PATENT DOCUMENTS

| | | |
|---|---|---|
| 1,809,106 | 6/1931 | Carlin . |
| 4,087,306 | 5/1978 | Head et al. ........................ 156/401 |
| 4,163,683 | 8/1979 | Lammelein, Jr. ................ 156/401 |
| 4,683,021 | 7/1987 | Stalter et al. .................... 156/403 |
| 4,953,605 | 9/1990 | Kawamura et al. . |

FOREIGN PATENT DOCUMENTS

| | | |
|---|---|---|
| 56-43010 | 4/1981 | Japan . |
| 1243187 | 8/1917 | United Kingdom . |
| 0735433 | 5/1980 | U.S.S.R. . |

Primary Examiner—Michael W. Ball
Assistant Examiner—Nancy T. Krawczyk
Attorney, Agent, or Firm—Russell W. Warnock; Alan A. Csontos

[57] ABSTRACT

A method of building a tire comprises providing an apexed bead with a first bead ribbon having a first bead portion including rubberized parallel extending bead wires. A first rubber apex leaf extends laterally from the first bead portion. A second bead ribbon has a second bead portion with rubberized parallel extending bead wires. A second rubber apex leaf extends laterally from the second bead portion. The second bead portion is located radially of said first bead portion to form a bead. The first and second apex leafs radially contact each other to form an apex with a substantially triangular cross-section taken in a plane extending transverse to the bead wires. The apex extends laterally from and integral with the bead. The apexed bead is placed radially of a cylindrically formed tire carcass ply. An axial end of the carcass ply is turned around the apexed bead. The apex portion is moved from an axial surface of the bead portion to a radial surface of the bead portion.

3 Claims, 7 Drawing Sheets

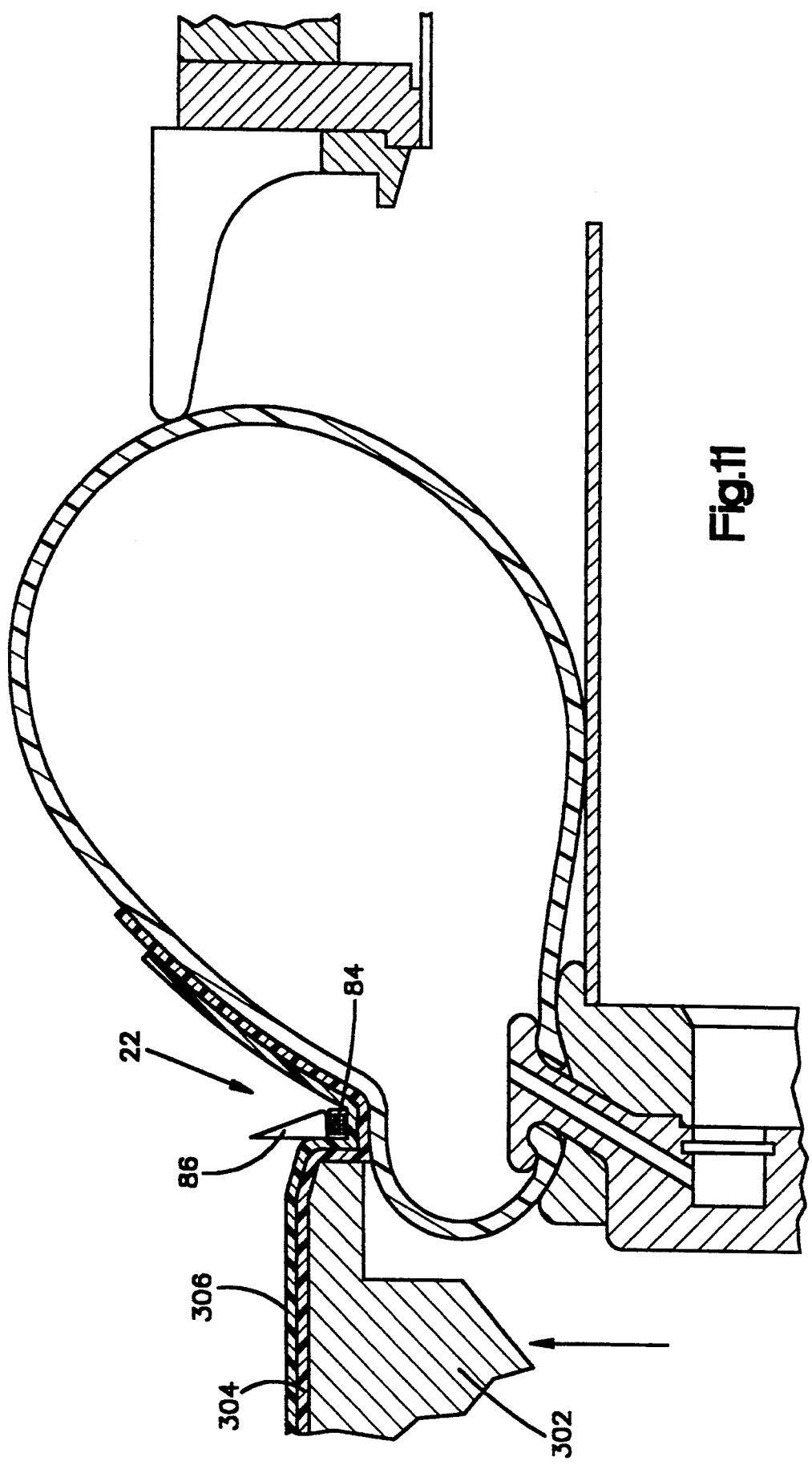

APEXED BEAD FOR A TIRE

This is a continuation of copending application(s) Ser. No. 07/846,749 filed on Mar. 9, 1992, now abandoned, which is a continuation of Ser. No. 07/574,336 filed Aug. 28, 1990, now abandoned.

BACKGROUND OF THE INVENTION

1. Field of the Invention

The present invention relates generally to a bead and apex for a vehicle tire. In particular, the present invention relates to a bead and apex formed as an integral unit and to a method for making a tire incorporating such integral bead and apex unit.

2. Description of the Prior Art

A bead and an apex for use in the construction of a vehicle tire are known. For example, U.S. Pat. No. 1,809,106 discloses a bead ribbon having a bead portion with rubber located about parallel extending bead wires. A strip of rubber extends laterally outwardly and upwardly from one edge of the bead portion. The bead ribbon is wound spirally about itself a plurality of times to form a bead core ring. The bead core ring is placed around a carcass ply that is supported on a drum in a cylindrical form. The rubber strips extend axially inward along the carcass ply. The end of the carcass ply is then turned over the bead core ring. The assembly is then removed from the drum. When the assembly is shaped into its a toroidal form of a finished tire, the entire bead core ring is turned 90 degrees. The agglomeration of rubber formed by the rubber strips extend from the same surface of the bead portion that the rubber strips extended from originally. However, the agglomeration now forms a radially oriented apex.

U.S. Pat. No. 4,168,193 discloses forming a wire bead ring. The bead ring is then placed in a mold. A cavity in the mold is injected with unvulcanized rubber to form a bead assembly with an apex portion extending substantially radially of the bead ring.

Bead and apex assemblies, such as those referenced above, have certain disadvantages. For example, a bead that is typically used today is substantially inextensible and is extremely difficult to turn through a 90 degree angle. In fact, modern radial tire building operations and machines have been adapted to accept the relatively inextensible beads which are not turned any appreciable amount during construction of a vehicle tire. Furthermore, injecting uncured rubber about a bead ring requires an additional manufacturing step, additional handling and additional capital equipment in the form of the injection molding apparatus. All of these additions can be costly to the forming of an apexed bead.

SUMMARY OF THE INVENTION

The present invention is directed to an apexed bead for a vehicle tire and to a method for making a tire incorporating the apexed bead. The apexed bead for a vehicle tire comprises a first ribbon having a first bead portion with rubberized parallel extending bead wires. A first rubber apex leaf extends laterally from an edge of the first bead portion. A second ribbon has a second bead portion with rubberized parallel extending bead wires. A second rubber apex leaf extends laterally from an edge of the second bead portion. The second bead portion is located radially of the first bead portion to form a bead. The first and second apex leafs radially contact each other along respective facing surfaces to form an apex with a substantially triangular cross-section taken in a plane extending transverse to the extent of the bead wires. The apex extends laterally from and integral with the bead.

The method of building a tire which incorporates an apexed bead includes providing the apexed bead having an apex portion extending laterally from a bead portion. The apexed bead is placed radially of a cylindrically arranged tire carcass ply. An axial end of the carcass ply is turned around the apexed bead. The apex portion is moved from an axial location relative to the bead portion to a substantially radial location relative to the bead portion.

BRIEF DESCRIPTION OF THE DRAWINGS

Further features of the present invention will become apparent to those skilled in the art to which the present invention relates from reading the following specification with reference to the accompanying drawings, in which:

FIG. 11 is a view of the tire building machine of FIG. 10 with parts in different positions and illustrating the changed location of the apex to a radial location relative to the bead.

DESCRIPTION OF PREFERRED EMBODIMENTS OF THE INVENTION

Figure 1:
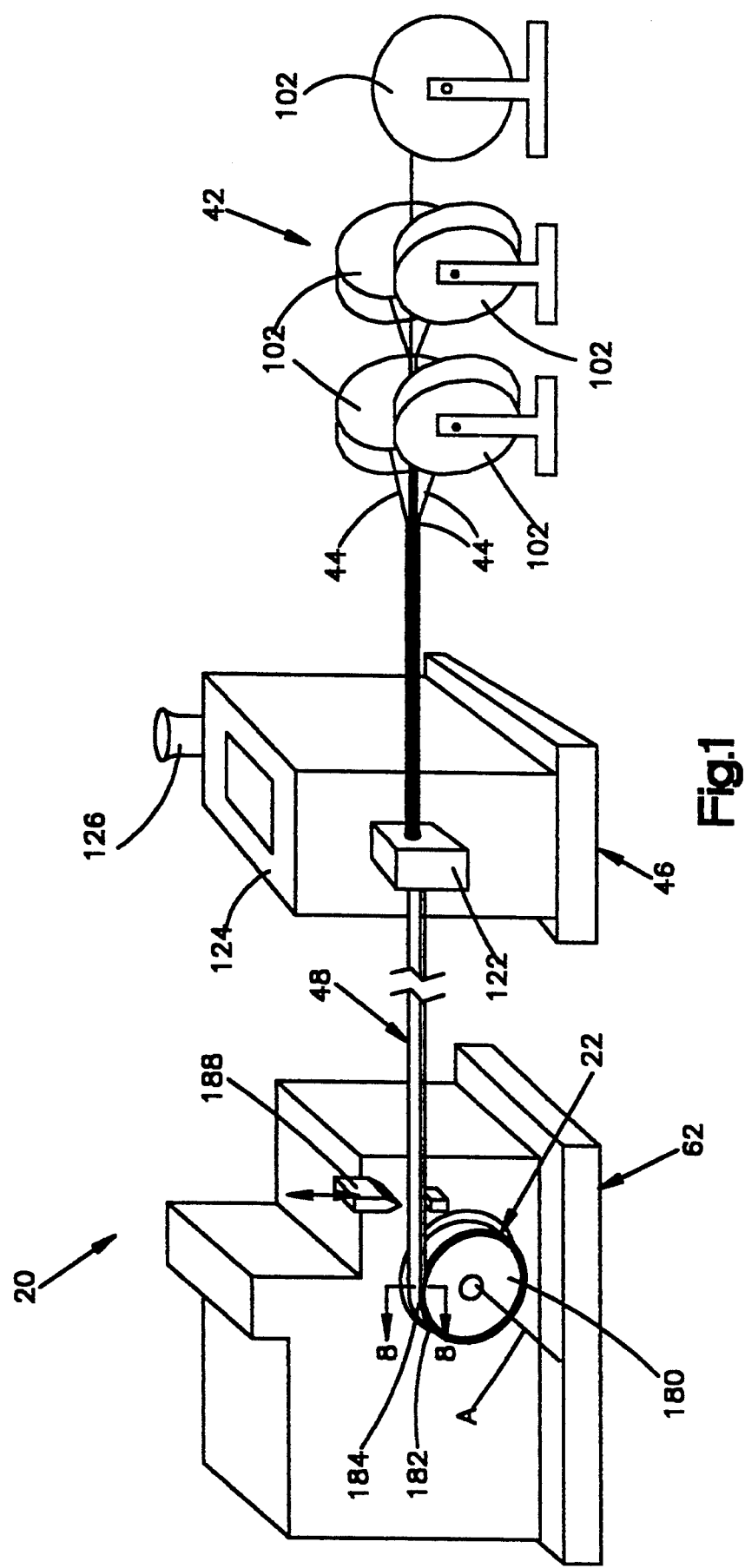
FIG. 1 is a schematic view of an apparatus which is used for making an apexed bead.

An apparatus 20 for making an apexed bead ring 22 is illustrated in FIG. 1. The bead making apparatus 20 includes a station 42 for delivering prepared bead wire 44 to a rubberizing station 46. The rubberizing station 46 deposits uncured rubber around the bead wires 44 and forms a bead ribbon 48. The term rubber as used herein is intended to include any natural or synthetic rubber or any combination thereof. The bead ribbon 48 is then guided to a bead ring winder 62. The bead ring winder 62 spirally winds several layers of bead ribbon 48 (FIGS. 8 and 9) about itself to form the hoop-like apexed bead ring 22. The finished apexed bead ring 22 is suitable for use in the construction of a vehicle tire.

The bead wire delivery station 42 includes reels 102 supported for rotation to deliver individual bead wires 44 to the rubberizing station 46. The bead wire 44 is preferably steel, but any suitable material may be used to form a substantially inextensible bead ribbon 48. In a preferred embodiment of the invention, five reels 102 of bead wire 44 are illustrated. However, it will be apparent that any suitable number of reels 102 and bead wire 44 may be used for the particular configuration of bead ribbon 48 desired.

The bead wires 44 are continuously pulled into the rubberizing station 46 in a substantially parallel, equally spaced and planar relationship. The bead wires 44 extend in the longitudinal direction to carry load in the substantially continuous and elongate bead ribbon 48.

Figure 2:
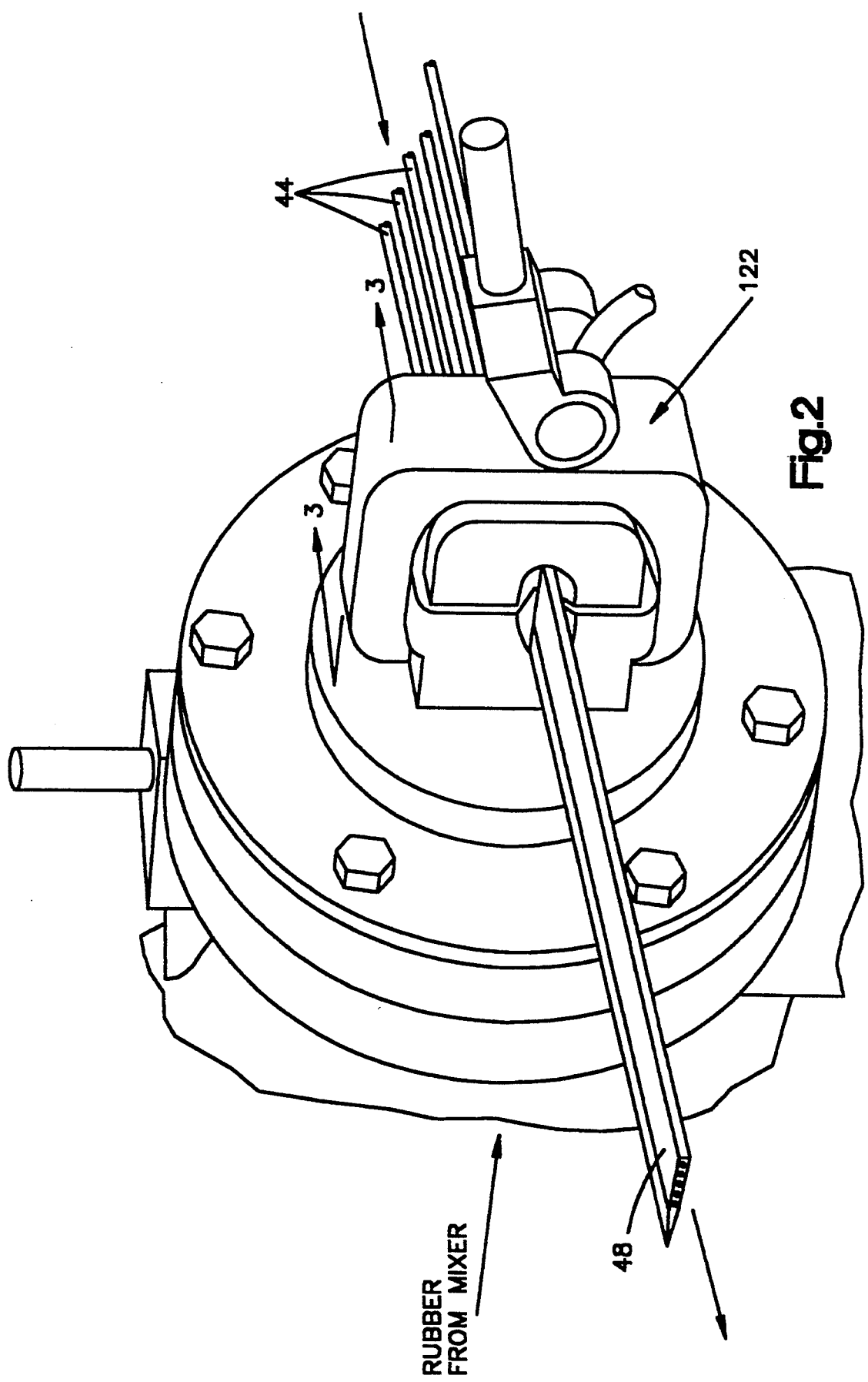
FIG. 2 is an enlarged view of a portion of a bead extruder head of the apparatus in FIG. 1.

The rubberizing station 46 includes an extruder head 122, a feeding station 124, and a hopper 126. The hopper 126 receives uncured rubber stock and supplies the rubber stock to the feeding station 124. The feeding station 124 mixes the rubber stock and delivers the rubber to the extruder head 122 (FIG. 2).

Figure 3:
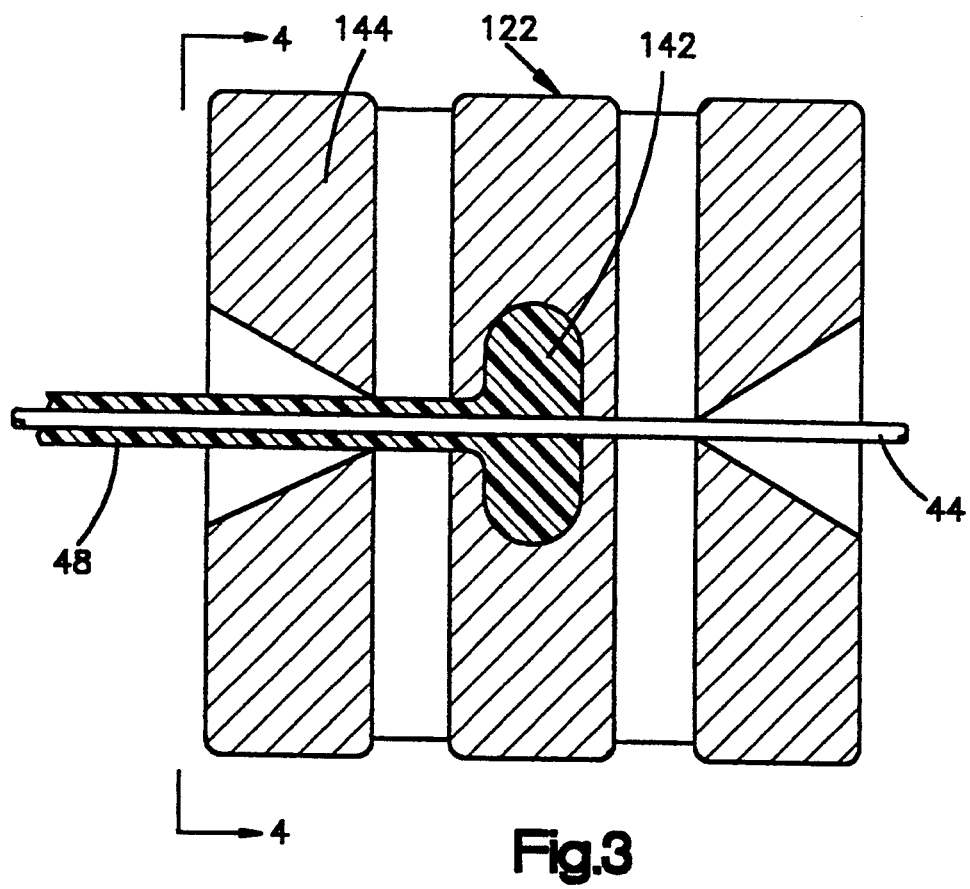
FIG. 3. is a cross-sectional view of the extruder head in FIG. 2, taken approximately along line 3—3 in FIG. 2.
Figure 4:
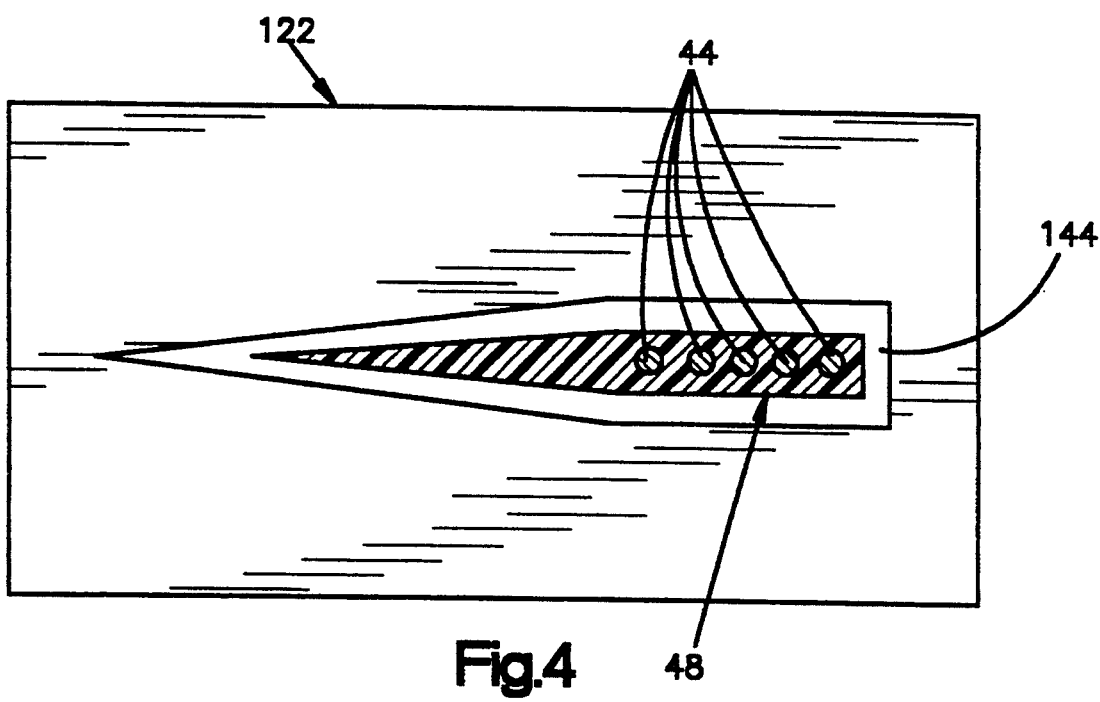
FIG. 4 is an end view of the extruder head in FIG. 3, taken along line 4—4 in FIG. 3.
Figure 5:
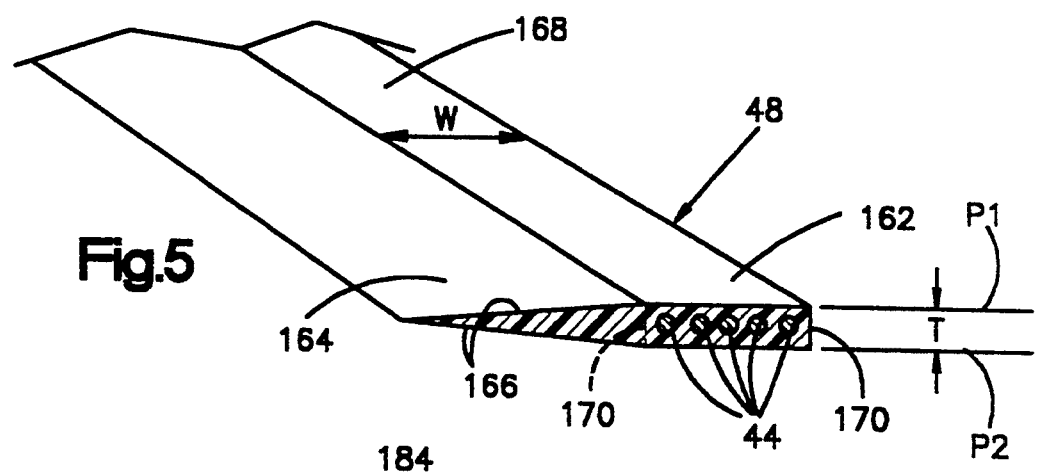
FIG. 5 is a partial perspective view of a portion of a bead ribbon embodying the present invention.

Uncured rubber 142 (FIG. 3) is deposited around the bead wires 44 as the bead wires are pulled through the extruder head 122. After the rubber 142 is deposited around the bead wires 44, a die portion 144 (FIG. 4) of the extruder head 122 forms the rubberized bead ribbon 48 into a predetermined shape, as illustrated in FIG. 5.

The bead ribbon 48 includes a bead portion 162 (FIG. 5) which contains the rubberized bead wires 44 and functions as a load carrying portion. An apex leaf 164 extends axially or laterally of the bead wires 44 from the bead portion 162. The apex leaf 164 is formed integrally as one piece with the bead portion 162. In the preferred embodiment, the apex leaf 164 has a substantially triangular cross-section taken in a plane extending transverse of the extent of the bead wires 44. It will be apparent that the cross-sectional shape of the apex leaf 164 may be something other than triangular. For example, any cross-sectional shape may be used and is dependent upon the desired shape of the finished apex on the apexed bead ring 22, as is described below.

The apex leaf 164 is shown to have a pair of equal length legs 166 which are straight. However, it will be apparent that the exact length and shape of each leg 166 would depend on the exact application and final configuration of the apexed bead ring 22 that is desired. The apex leaf 164 extends from the bead portion 162 between a pair of planes P1, P2 which are coextensive with and define the limits of opposite major side surfaces 168 of the bead portion. The major side surfaces 168 are defined as the surfaces of the bead portion 164 having a transverse dimension (width W) greater than the transverse dimension (thickness T) of the minor side surfaces or edges 170 of the bead portion 162.

Thus, the one piece bead ribbon 48 is formed in a single operation having a bead portion 162 and an apex leaf 164. No additional capital equipment is required to form the bead ribbon 48. Existing equipment can be modified easily to produce the bead ribbon 48.

In the preferred embodiment of the invention, the rubber in the bead portion 162 and in the apex leaf 164 are from the same stock and have substantially the same durometer hardness. In an alternate embodiment the apex leaf 164 may be made from a rubber having a higher durometer hardness than the durometer hardness of the rubber in the bead portion 162. This may be accomplished by the higher durometer rubber being separately delivered to the extruder head 122 by another or a modified feeding station 124.

Figure 8:
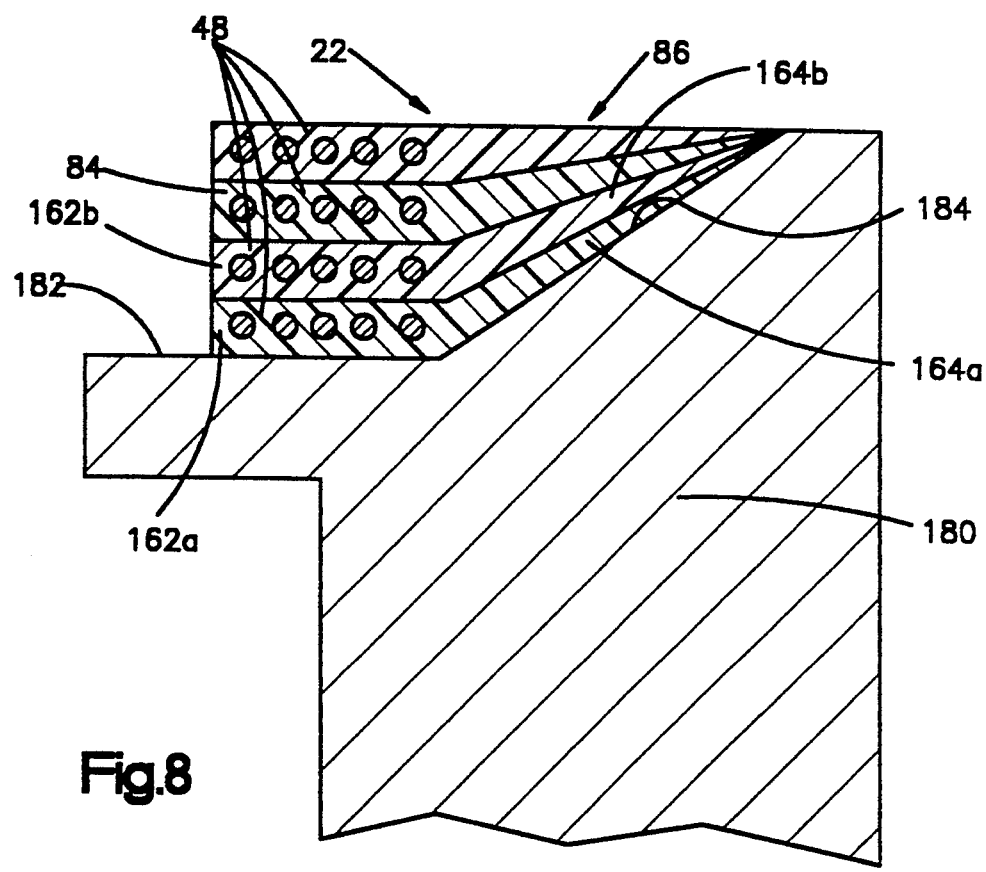
FIG. 8 is a cross-sectional view of the forming wheel in FIG. 1, taken approximately along line 8—8 in FIG. 1, cooperating with several spirally wound bead ribbons to form the apexed bead.

After the bead ribbon 48 exits the rubberizing station 46 it may be cut off and stored for future use. Preferably, however, the bead ribbon 48 is directed to the bead ring winder 62 where the bead ribbon is spirally wound into the finished hoop-like apexed bead ring 22, as illustrated in FIG. 8. Typically, the bead ribbon 48 will pass between pull drums (not shown) and a through festooner (not shown), both of which are located between the rubberizing station 46 and the bead ring winder 62.

Figure 6:
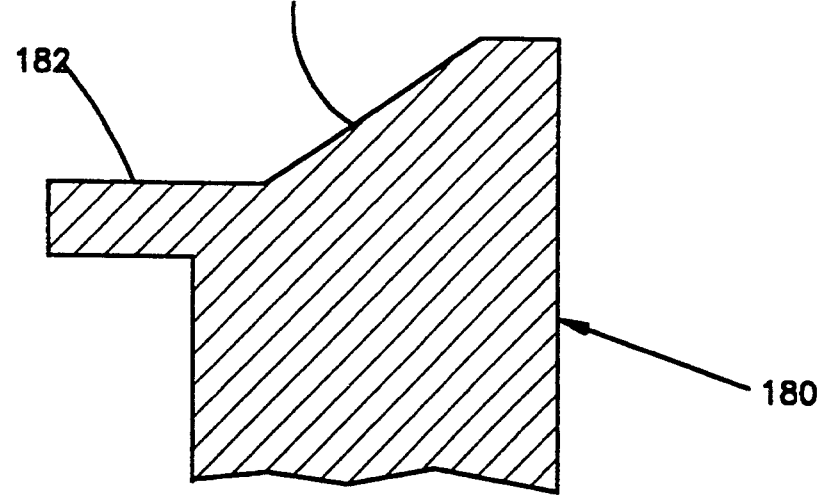
FIG. 6 is a cross-sectional view of a portion of a specially shaped forming wheel of a bead ring winder in FIG. 1.
Figure 7:
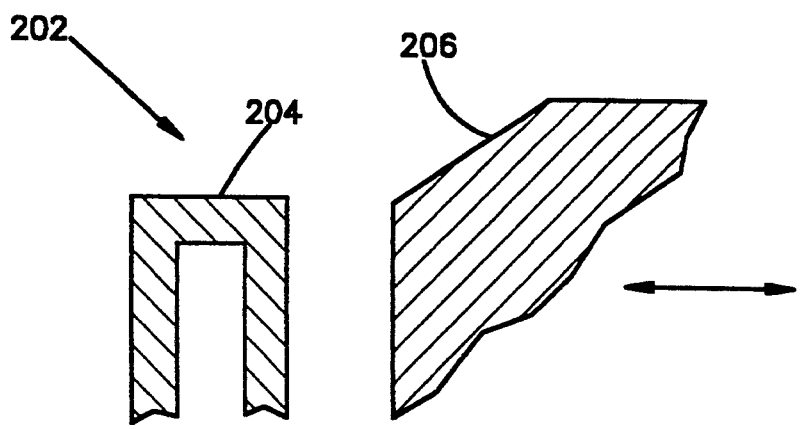
FIG. 7 is a cross-sectional view of a forming wheel of an alternate embodiment of the present invention.

The bead ring winder 62 includes a specially shaped forming wheel 180, as illustrated in FIGS. 6 or 7 which receives and supports the bead ribbon 48 to shape the finished apexed bead ring 22. In the preferred embodiment, a cylindrical surface 182 (FIGS. 6 and 8) receives and supports the bead portion 162 of the bead ribbon 48 to form a bead 84. The forming wheel 180 is rotatable about its longitudinal central axis A. The forming wheel 180 is driven to rotate a plurality of revolutions in order to spirally wind the bead ribbon 48 about itself an appropriate number of predetermined times. Spiral winding as used herein means the buildup of bead ribbon 48 substantially only in the radial direction relative to the axis A.

An inclined surface 184 of the forming wheel 180 engages the radially innermost apex leaf 164a. The inclined surface 184 preferably is frustoconical. The inclined surface 184 forces the innermost apex leaf 164a radially outward of the axis A. Upon a subsequent spiral wind of the bead ribbon 48, it will be apparent that the next radially outward apex leaf 164b will be deposited on the innermost apex leaf 164a to form an apex 86 extending laterally of the bead 84. The winding will continue until the desired finished shape of the apexed bead ring 22 is attained. The finished shape of the apex 86 is preferably substantially triangular in cross-section, taken in a plane transverse to the bead wires 44. It will be apparent that the apex 86 may be formed in other shapes.

The tackiness of the external surfaces of the bead ribbon 48 retain the parts of the apexed bead ring 22 in the desired hoop-like shape after the apexed bead ring is removed from the forming wheel 180. It will be apparent that the inclined surface 184 may have another shape other than frustoconical, depending on the desired shape of the finished apex 86 of the apexed bead ring 22. For example, the inclined surface 184 may be cup-shaped if a curved surface on the apex 86 is desired. As is known, an apex is used to space apart portions of sheet material used in tire construction as the sheet material is turned around a bead.

Once the desired number of revolutions of the forming wheel 180 have been accomplished, for example four revolutions in the illustrated embodiment, the finished apexed bead ring 22 having an integral apex 86 extending substantially axially or laterally from the bead 84 is provided. Once the desired number of layers of the bead ribbon 48 has been established on the forming wheel 180, the bead ribbon 48 is severed by a cut-off apparatus 188 (FIE. 1). The apexed bead ring 22 is then removed from the forming wheel 180 by moving the apexed bead axially to the left as viewed in FIG. 8. It will be apparent that the angle and length that the apex 86 extends from the bead 84 can be changed. For example, the angle of the apex 86 can be changed by changing the angle on the surface 184 of the forming wheel 180. The length of the apex 86 can be changed by providing a longer apex leaf 164 on the bead ribbon 48.

In order to start making a subsequent apexed bead ring 22, the newly cut leading edge of the bead ribbon 48 is placed on the forming wheel 180. The tackiness of the contacting surface of the bead ribbon 48 on the forming wheel 180 is sufficient so that friction between the bead ribbon and the forming wheel pulls the bead ribbon onto the forming wheel during rotation of the forming wheel.

Figure 9:
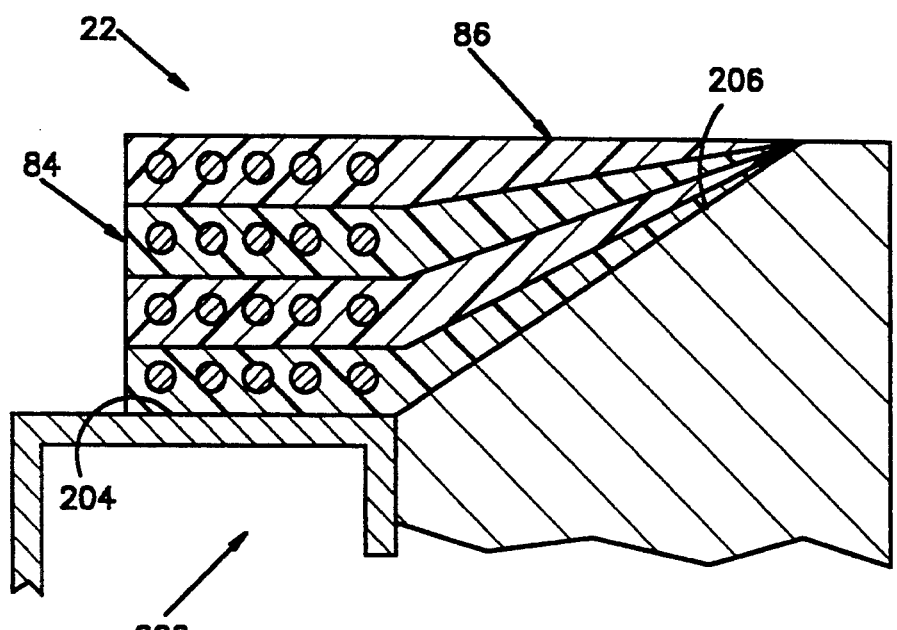
FIG. 9 is a cross-sectional view of the forming wheel in FIG. 7 cooperating with several spirally wound bead ribbons to form the apexed bead.

An alternate embodiment of the present invention is illustrated in FIGS. 7 and 9. FIG. 7 illustrates a forming wheel made 202 from two parts. The forming wheel 202 includes a cylindrical surface 204 for supporting the bead portion 162 of the bead ribbon 48. An inclined surface 206 is provided and is movable axially relative to the cylindrical surface 204. The inclined surface 206 is preferably frustoconical. The surfaces 204 and 206 are concentric and driven rotatably about the axis A, in the same manner that the forming wheel 180 described above is driven, to spirally wind successive layers of bead ribbon 48 about itself to form a finished apexed bead fine 22, as illustrated in FIG. 9.

After the desired number of layers of the bead ribbon 48 have been deposited on the surfaces 204,206, the inclined surface 206 is moved axially to the right as viewed in FIG. 9 an appropriate amount. The appropriate amount is at least slightly larger than the width of the apexed bead ring 22. The apexed bead ring 22 can be moved axially off the surface 204 and may then be radially moved between the surfaces 204 and 206. It will be apparent that the inclined surface 206 is supported for rotation from the right side as viewed in FIG. 9 whereas the cylindrical surface 204 is supported for rotation from the left side as viewed in FIG. 9 to allow the apexed bead ring 22 to be removed from the forming wheel 202.

Figure 10:
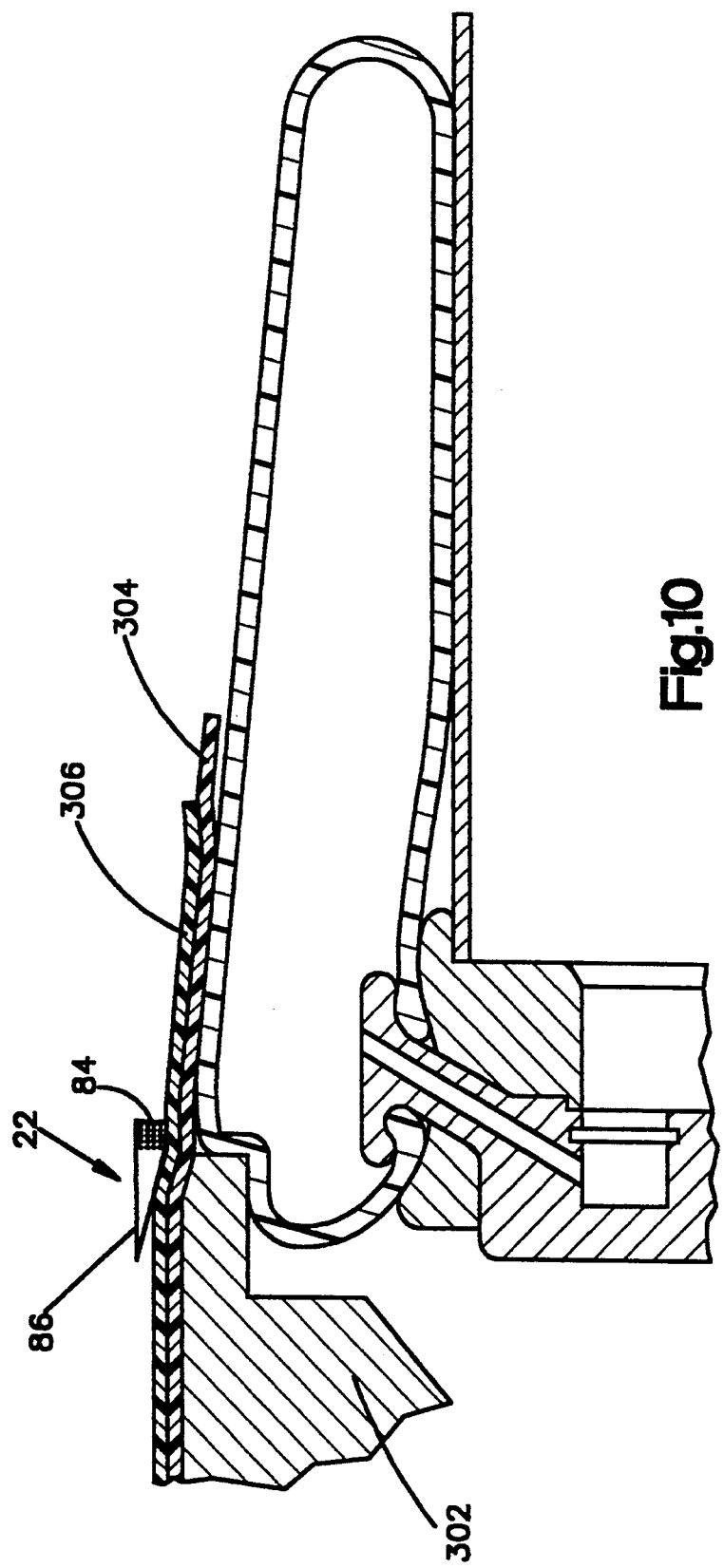
FIG. 10 is a cross-sectional view of a portion of a tire building machine and the apexed bead illustrating the axial location of the apex relative to the bead.

After the apex bead ring 22 has been formed, it is a substantially circumferentially inextensible hoop-like member and is usable in a tire building operation. A machine used for a first stage radial tire building operation includes a drum end 302 (FIG. 10) which is radially expandable and contractable. The drum end 302 is illustrated in FIG. 10 in its contracted position and supports an innerliner 304 and a carcass ply layer 306. The apexed bead ring 22 is placed radially about the carcass ply layer 306, as illustrated in FIG. 10. The apexed bead ring 22 is positioned so that the apex 86 is located to extend from an axially surface or edge of the bead 84. The apex 86 is positioned in an unconventional orientation from the apexes of the prior art.

During the first stage operation, the drum end 302 is expanded radially outward to the position illustrated in FIG. 11. During this expansion of the drum end 302, the apex 86 of the apexed bead ring 22 is forced to move or "flow" because it is made of a relatively soft rubber material. The apex 86 moves from an axial or lateral orientation relative to the bead 84 into a radial orientation relative to the bead so that the apex now contacts and extends from a radial outermost surface or edge of the bead. Some movement or "flow" of the apex 86 may occur in subsequent operations as well, for example, during a second stage building operation or during curing. It is important to note that the bead 84 of the apexed bead ring 22 has not turned at all during the tire build operation. For example, in FIG. 10 the bead 84 is illustrated as having four layers of bead ribbon 48. Each layer of bead ribbon 48 has five bead wires 44. In FIG. 11 it will be noted that the four layers of bead ribbon 48 in the bead 84 have not reoriented. Specifically, the bead 84 has not turned through a 90° angle.

The outer edge or end of the carcass ply layer 306 and of the inner liner 304 are turned over the apexed bead ring 22, as is known, to form a cylindrical assembly for use during a second stage tire building operation. The tackiness of the layers 304,306 and the apexed bead ring 22 allow the parts of the assembly to maintain their relative positions throughout subsequent operations that will be performed before the tire is cured.

From the above description of preferred embodiments of the invention, those skilled in the art will perceive improvements, changes and modifications. Such improvements, changes and modifications within the skill of the art are intended to be covered by the appended claims.

Having described preferred embodiments of the invention, what is claimed is:

1. A method of forming a tire component, comprising:
   producing an apexed bead ring having a plurality of bead wire laterally spaced apart from one another transversely of the lengthwise extent of the apexed bead ring and an integrally formed apex portion extending laterally on one side of the plurality of bead wires;
   winding the apexed bead ring onto itself about a winding axis parallel to the lateral extent of the apexed bead ring to form a bead hoop with the apex portion of the apexed bead ring being lapped upon itself to form one edge of the bead hoop;
   providing a tire carcass ply disposed in cylindrical form about a carcass ply axis;
   placing the bead hoop on the tire carcass ply in an initial bead hoop orientation in which the one edge of the bead hoop formed by the lapped apex portion extends in a substantially axial orientation relative to the carcass ply axis and the bead wires of the bead hoop extend generally circumferentially adjacent the tire carcass ply; and
   manipulating the tire carcass ply relatively about the bead hoop to create a tire component formed of the bead hoop and the tire carcass ply turned around the bead hoop, the step of manipulating including manipulating the tire carcass ply to displace the apex portion of the bead hoop from its substantially axial orientation to a substantially radial orientation in such a manner that only the apex portion is reoriented while the bead wires of the bead hoop remain in their same initial orientation.

2. The method according to claim 1 wherein the step of producing an apexed bead ring includes shaping the apex portion of the apexed bead ring in a triangular cross sectional shape as viewed in a plane transverse to the lengthwise extent of the apexed bead ring.

3. The method according to claim 1 wherein the step of producing an apexed bead ring includes depositing rubber of a selected durometer hardness around the plurality of bead wires and forming the apex portion from a rubber having a durometer hardness greater than the selected durometer hardness of the rubber deposited around the bead wires.

* * * * *